(12) United States Patent
Schmidt et al.

(10) Patent No.: US 11,595,936 B2
(45) Date of Patent: Feb. 28, 2023

(54) ANTENNA REFERENCE SIGNALS FOR DISTANCE MEASUREMENTS

(71) Applicant: IPCom GmbH & Co. KG, Pullach (DE)

(72) Inventors: Andreas Schmidt, Braunschweig (DE); Maik Bienas, Schoeppenstedt (DE)

(73) Assignee: IPCOM GMBH & CO. KG, Pullach (DE)

( * ) Notice: Subject to any disclaimer, the term of this patent is extended or adjusted under 35 U.S.C. 154(b) by 481 days.

(21) Appl. No.: 16/622,992

(22) PCT Filed: Jun. 22, 2018

(86) PCT No.: PCT/EP2018/066717
§ 371 (c)(1),
(2) Date: Dec. 16, 2019

(87) PCT Pub. No.: WO2018/234526
PCT Pub. Date: Dec. 27, 2018

(65) Prior Publication Data
US 2020/0163043 A1 May 21, 2020

(30) Foreign Application Priority Data
Jun. 22, 2017 (EP) .................................. 17177410

(51) Int. Cl.
*H04W 64/00* (2009.01)
*G01S 5/00* (2006.01)
(Continued)

(52) U.S. Cl.
CPC ......... *H04W 64/006* (2013.01); *G01S 5/0072* (2013.01); *G01S 13/765* (2013.01);
(Continued)

(58) Field of Classification Search
CPC ............ H04W 64/006; H04W 56/001; H04W 64/003; H04W 72/0446; G01S 5/0072;
(Continued)

(56) References Cited

U.S. PATENT DOCUMENTS

2008/0097700 A1    4/2008  Grimm
2016/0295624 A1* 10/2016  Novlan .................. H04L 67/12
2018/0220388 A1*  8/2018  Chae .................... H04W 76/14

FOREIGN PATENT DOCUMENTS

CN        102565758 A     7/2012
CN        104960524 A    10/2015
(Continued)

OTHER PUBLICATIONS

International Search Report for International Application No. PCT/EP2018/066717, dated Sep. 3, 2018.
English Translation of the Second Office for Chinese Application No. 201880041625.9, dated May 28, 2021.
English Translation of the Third Office Action for Chinese Application No. 201880041625.9, dated Aug. 24, 2021.
(Continued)

*Primary Examiner* — Kyaw Z Soe
(74) *Attorney, Agent, or Firm* — Marshall, Gerstein & Borun LLP

(57) ABSTRACT

The present invention provides a method of communicating vehicle positioning information, wherein signals are transmitted from at least one vehicle mounted antenna for indicating a position of the vehicle to another entity, the signals including information concerning at least one of an identity of the at least one antenna and information providing a displacement between the at least one antenna and a boundary of the vehicle.

13 Claims, 3 Drawing Sheets

(51) Int. Cl.
  *G01S 13/76* (2006.01)
  *G01S 13/931* (2020.01)
  *H04L 5/00* (2006.01)
  *H04W 56/00* (2009.01)
  *H04W 72/04* (2009.01)
  *H04W 72/0446* (2023.01)

(52) U.S. Cl.
  CPC .......... *G01S 13/931* (2013.01); *H04L 5/0051* (2013.01); *H04W 56/001* (2013.01); *H04W 64/003* (2013.01); *H04W 72/0446* (2013.01); *G01S 2013/932* (2020.01); *G01S 2013/9322* (2020.01)

(58) Field of Classification Search
  CPC .................. G01S 13/765; G01S 13/931; G01S 2013/932; G01S 2013/9322; H04L 5/0051
  See application file for complete search history.

(56) References Cited

FOREIGN PATENT DOCUMENTS

| | | |
|---|---|---|
| CN | 105588576 A | 5/2016 |
| CN | 105931495 A | 9/2016 |
| JP | 2005-241486 A | 9/2005 |
| WO | WO-2016159712 A1 | 10/2016 |
| WO | WO-2017007285 A1 | 1/2017 |

OTHER PUBLICATIONS

First Examination Report from Indian Application No. 201917051566, dated Aug. 31, 2021.
Notice of Reasons for Refusal for Japanese Patent Application No. 2019-564422, dated Aug. 17, 2021.

\* cited by examiner

ANTENNA REFERENCE SIGNALS FOR DISTANCE MEASUREMENTS

The present invention relates to the generation of signals for example by a user equipment device for assistance in providing vehicle positioning information.

A communication system deployed according to 3GPP's suite of LTE specifications uses Orthogonal Frequency Division Multiplexing, OFDM, in a downlink direction (tower to handset) and Single Carrier Frequency Division Multiple Access, SC-FDMA, in an uplink direction (handset to tower) on its wireless Uu interface, i.e. on an air interface between a mobile device (User Equipment, UE) and a base station (eNodeB, eNB).

To allow for coherent demodulation at the receiving side, reference signals (or pilot symbols) are inserted by the sending entity in the OFDM (downlink) or SC-FDMA (uplink) time-frequency resource grid to enable channel estimation. Unlike a physical channel that carries information originating from higher layers of the protocol stack, physical signals correspond to a set of resource elements used by the physical layer itself and do not carry information originating from higher layers. Instead they contain known symbols (i.e. pre-defined sequences of data), so called reference or pilot symbols. Physical signals are generated and impressed directly at PHY level on certain (i.e. pre-defined) resource elements.

Downlink reference symbols (cell-specific reference signals) are inserted within the first and third last OFDM symbol of each slot (this corresponds to the fifth OFDM symbols of the slot in case of normal cyclic prefix) with a frequency domain spacing of six sub-carriers. Furthermore, there is a frequency domain staggering of three sub-carriers between the first and second reference symbols. Consequently, there are four reference symbols within each resource block (i.e. in a block made up of twelve sub carriers and seven OFDM symbols in case of normal cyclic prefix). The user equipment will interpolate over multiple reference symbols to estimate the channel quality.

In case of two transmit antennas, reference signals are inserted from each antenna where the reference signals of the second antenna are offset in the frequency domain by three sub-carriers. To allow the user equipment to accurately estimate the channel coefficients, nothing is transmitted on the other antenna at the same time-frequency location of reference signals. That means, in those resource elements in which antenna #0 sends its reference signals R0, antenna #1 does not send neither any information provided by higher layers nor its own reference signals R1 (and vice versa). Doing so guarantees that the receiving user equipment can estimate the quality of two spatially separated radio channels (namely, one to antenna #0 and another one to antenna #1). The same principle can be extended to four distinct antennas and so on.

Reference symbols have complex values. More information on reference signals to be used in a downlink direction can be found in section 6.10.1. of 3GPP TS 36.211.

There are also two types of reference signals for the uplink direction in LTE.

The first type is a demodulation reference signal (DM-RS) which is used to enable coherent signal demodulation at the eNodeB. These signals are time multiplexed with uplink data and are transmitted on the fourth or third SC-FDMA symbol of an uplink slot for normal or extended CP, respectively, using the same bandwidth as the data. DM-RS are associated with uplink resources used for the transmission of PUSCH or PUCCH.

The second type is a sounding reference signal (SRS) which is used to allow channel dependent (i.e. frequency selective) uplink scheduling as the DM-RS cannot be used for this purpose, since they are assigned over the assigned bandwidth to a UE. The SRS is introduced as a wider band reference signal typically transmitted in the last SC-FDMA symbol of a 1 ms sub frame. User data transmission is not allowed in this part of the resource grid, which results in about 7% reduction in uplink capacity. The SRS is an optional feature and is highly configurable to control overhead; it can even be turned on or off in a given cell. Users with different transmission bandwidths share this sounding channel in the frequency domain.

More information on reference signals to be used in an uplink direction can be found in section 5.5 of 3GPP TS 36.211.

In addition, details about the LTE physical layer and RSs in general can, for instance, be found in a white paper entitled "LTE in a Nutshell: The Physical Layer" by Telesystem Innovations, http://www.tsiwireless.com/docs/whitepapers/LTE%20in%20a%20Nutshell%20-%20Physical%20Layer.pdf In context of the present invention, any kind of reference signal, such as the downlink or uplink reference signals discussed above, can be used as a unique antenna identifier. Therefore, different reference symbols are used for each antenna.

Another type of physical signals directly impressed in the physical layer on certain resource elements of the LTE downlink resource grid (and thus not carrying any information provided by higher layers of the protocol stack) are the LTE synchronization signals.

In every downlink resource lattice, regardless of the configured bandwidth, primary and secondary synchronization symbols are located in the last two symbols of slots #0 and #10. These are not spread over the entire bandwidth of the carrier; instead they only stretch over the six inner resource blocks (RBs), i.e. from RB #47 to RB #52 (this RB numbering is valid only for a system bandwidth of 20 MHz. In case of a smaller system bandwidth, the numbering differs; in any case, the synchronization symbols are located around the DC carrier).

Primary synchronization signals, PSS, are:
- located in the six innermost resource blocks (RBs) centered around the DC-carrier in symbol #6 of
  slot #0 (in subframe #0) and
  slot #10 (in subframe #5);
- built from a Zadoff-Chu sequence of length 62
- three different sequences are defined, selected based on the physical cell ID;
- out of 72 sub carriers only 62 are carrying the PSS data;
- the remaining 10 subcarriers (5 on each side) are zero padded;
- used for downlink frame synchronization;
- used to determine the physical cell ID (together with secondary synchronization signals, SSS).

In an LTE TDD system, the PSS are mapped to the third symbol of the first slot in subframes #1 and #6.

Secondary synchronization signals, SSS, are
- located in the six innermost resource blocks (RBs) centred around the DC-carrier in symbol #5
  in slot #0 (subframe #0) and
  in slot #10 (subframe #5);
- the SSS sequence used in subframe #0 is different from the one used in subframe #5;
- 168 three different sequences are defined, selected based on the physical cell ID;

made up of 62 scrambling sequences (based on m-sequence calculation);

the values in odd indexed resource element and the ones in even indexed resource elements is generated from different equations;

used for downlink frame synchronization;

used to determine the physical cell ID (together with the PSS).

In an LTE TDD system, the SSS are mapped to last symbol of the second slot of subframes #0 and #5.

The symbol location of PSS/SSS in the time domain is different between an FDD and a TDD system as this helps the UE to identify, if this is an FDD or a TDD system.

Since the location of PSS/SSS is always fixed in frequency domain, the UE can easily do a correlation at the expected band to get the PSS/SSS, from which the UE can acquire many parameters such as the physical cell ID (PCID), the duplexing mode FDD vs. TDD (from the location of PSS/SSS in the time domain), the subframe number (from the SSS sequence), and information about the slot boundary.

PSS and SSS together define the physical cell ID (PCID) of a radio cell. A UE detects the physical layer identity from PSS and the physical layer cell identity group from SSS. As discussed above, there are three different PSS(=Layer_ID) and 168 different SSS(=Group_ID), limiting the maximum number of PCIDs to 504. The PCID is composed according to the following formula:

PCID=3*Group_ID+Layer_ID

Vehicular communication services include the following four different types: vehicle-to-vehicle V2V, vehicle-to-infrastructure V2I, vehicle-to-network V2N and vehicle-to-pedestrian V2P, generally referred to as "V2X services".

LTE support for vehicular communication was studied and specified in 3GPP during Rel-14 timeframe, as widely deployed LTE networks provide an excellent opportunity for the automotive industry to realize the vision of 'connected cars'. The outcome of 3GPP's feasibility study was summarized in TR 36.885 with the conclusion that it is feasible to support V2X services via the LTE PC5 interface with necessary enhancements (with respect to sidelink resource allocation, physical layer structure, and synchronization).

The study also considered vehicular communication scenarios based on not only the LTE "sidelink" PC5 interface but also the LTE UE to base station Uu interface (and a combination of Uu and PC5). The maximum efficiency of V2X services may be achieved by selecting/switching the operation scenario properly.

The LTE Uu air interfaces support uplink and downlink traffic, the LTE PC5 air interface is the sidelink interface that is of particular relevance for this invention.

Roadside units (RSU) may be deployed in form of stationary entities (e.g., mounted to street furniture) that communicate over the LTE PC5 air interface with vehicles (or pedestrians, or other RSUs) and offer either a wireless LTE Uu connection to nearby base stations, or a direct S1 connection into the core network.

The basic framework defined in LTE Rel-14 enhances the LTE PC5 and the LTE Uu air-interfaces, optimizing LTE technology for multiple V2X use cases. In summary, the following major changes were introduced: enhanced sidelink physical structure to improve demodulation performance in high-speed scenarios, support of GNSS based synchronization, sensing based resource selection for the UE autonomous operating mode, semi-persistent transmission and scheduling on sidelink. In addition, the utilization of vehicle location information for enhanced radio-resource management was enabled for UE autonomous and eNB controlled modes of operation to benefit V2X communication performance.

Recently, a need was identified for more accurate and reliable V2X positioning (cf. 3GPP TR 22.886), which could be achieved in V2X through multiple technologies, including but not limited to GNSS, camera input, lidar, radar, and mobility sensors. All these approaches have their own technical advantages and disadvantages. It is likely that positioning enhancements for V2X services will rely on (a combination of) various technologies to provide a more reliable and accurate positioning performance.

According to 3GPP TR 22.886, in future the 3GPP system shall support a relative lateral position accuracy of 0.1 m, and a relative longitudinal position accuracy of less than 0.5 m for UEs supporting V2X applications.

At 3GPP TSG RAN Plenary #75, it was proposed (cf. documents RP-170427 and RP-170428) to further investigate vehicular positioning technologies for LTE technology (with the intention to re-use the results, if possible, in LTE's "5G" successor technology later). In this context, distance measurements on the LTE PC5 air interface was mentioned in order to enable accurate inter-vehicle distance measurement and vehicle positioning. It was also stated that GNSS based solutions themselves may not provide sufficient accuracy for V2X positioning (or may not be available at all in some deployment scenarios, such as underground carparks, etc.).

Distance measurements based on the LTE PC5 air interface may be considered as one of the most promising solutions to estimate relative distances between vehicles. In some scenarios, these LTE PC5 based solutions can be considered as a complementary design option that can facilitate an overall improvement of V2X positioning performance.

The LTE PC5 air interface uses the same frequency/time resources that are also specified for uplink transmissions on the LTE Uu air interface, i.e. in case of FDD-LTE the uplink carrier frequencies are used and in case of TDD-LTE uplink subframes are used for sidelink communication in a given cell. The following physical sidelink channels PSxCH were defined:

Physical Sidelink Broadcast CHannel (PSBCH)
carries system and synchronization related information.
Physical Sidelink Discovery CHannel (PSDCH)
carries the sidelink discovery message.
Physical Sidelink Control CHannel (PSCCH)
carries control information for sidelink communication.
Physical Sidelink Shared CHannel (PSSCH)
carries the actual data for sidelink communication.

Sidelink transmission uses the same basic transmission scheme as the UL transmission scheme. However, sidelink is limited to single cluster transmissions for all the sidelink physical channels. Further, sidelink generally uses a one symbol gap at the end of each sidelink sub-frame. For V2X sidelink communication, PSCCH and PSSCH are transmitted in the same subframe. The sidelink physical layer processing differs from UL transmission in the following steps:

Scrambling:
for PSDCH and PSCCH, the scrambling is not UE-specific.
Modulation:
64 QAM is not supported for sidelink communication.

For the sidelink two types of physical signals were defined:
Sidelink Synchronization Signals (SLSS), and
Sidelink Demodulation Reference Signals (DM-RS).

FIG. 1 represents (a sub set of) a sidelink resource pool. Such (a sub set of) a resource pool may appear multiple times per sub frame in different parts of the frequency range. The Sidelink Synchronization Signals (SLSS) are made up of Primary Sidelink Synchronization Signals (PSSS) and Secondary Sidelink Synchronization Signals (SSSS) similar to the ones used in the legacy LTE Uu downlink resource grid. In the example of FIG. 1, there is a restriction to six physical resource blocks, PRBs, as the focus of this section lies on the SLSS that do not stretch beyond these PRBs; in real life deployments (a sub set of) a sidelink resource pool may have a broader bandwidth. Also, when other physical channels (i.e. other than the PSBCH shown in FIG. 1) are mapped to the various resource elements of the lattice, the location of the synchronization signals may vary. This is not shown in FIG. 1 for sake of simplicity.

Demodulation Reference Signals (DM-RS) associated with the various physical sidelink channels PSxCH (such as PSSCH, PSCCH, PSDCH, and PSBCH) shall be transmitted according to the Physical Uplink Shared CHannel (PUSCH) on the LTE Uu air interface with some exceptions, as defined in section 9.8 of TS 36.211.

For PSDCH and PSCCH, reference signals are created based on a fixed base sequence, cyclic shift and orthogonal cover code. For V2X sidelink communication, the cyclic shift for the PSCCH is randomly selected in each transmission.

Another exception is that the sidelink DM-RS sequence length equals the size (i.e. the number of sub-carriers) of the assigned resource.

Yet another exception is that, for V2X sidelink communication, reference signals are transmitted in 3rd and 6th symbols of the first slot and 2nd and 5th symbols of the second slot for PSSCH and PSCCH in case of normal CP, and in the $5^{th}$ and $7^{th}$ symbol of the first slot and $3^{rd}$ symbol of the second slot for PSBCH, i.e. more often than FIG. 1 suggests.

The number of the antenna port is one for all physical sidelink channels. Therefore, transmission or reception by simultaneously using multiple antennas is currently not specified for the sidelink.

JP 2005/241486 describes a means for measuring precisely a distance up to a preceding vehicle and a distance up to a following vehicle, from a prescribed vehicle, under a low cost condition using radar signals.

WO 2016/159712 A1 describes a V2X communication protocol in which a device may broadcast messages including position, type and direction information. The position information may provide an absolute position of the device using GPS data or a relative position.

WO 2017/007285 A1, also published as EP 3 322 234 A1 describes a D2D system with timing being based on a satellite timing.

As mentioned above, first ideas for work on Rel-15 had been submitted to 3GPP TSG RAN on the topic of "high accuracy positioning for vehicles". In this context some companies proposed to use the PC5 radio link between vehicles for direct ranging measurements. This endeavour is based on requirements defined by 3GPP SA1 working group that would like to bring the measurement granularity down to the centimetre range.

So far, discussions and visualizations have been based on a scenario in which there is only one antenna centrally mounted on the roof top of a vehicle. Vehicles equipped with multiple antennas, as for instance required to support MIMO, have not yet been discussed.

However, determining the exact distance to one or more antennas mounted on a vehicle doesn't help for the upcoming V2V ranging discussions in 3GPP, simply because of the large variety in the design of vehicles: one car may be equipped with a single antenna that is centrally located on the vehicle's roof top, while another car may be equipped with two planar antennas integrated in the window panes on both sides of the vehicle, and yet another car may be equipped with a set of four antennas, two located at the front (e.g. at the front bumper or mounted on the engine hood) and two at the back (e.g., at the rear bumper or on the lid of the car's trunk). Also, an average passenger car has dimensions of approximately four to five meters in length and up to two meters in width.

Thus, there will be an unacceptable uncertainty regarding the actual distance to the vehicles' outer boundaries and edges. This issue is not resolvable by just enhancing the accuracy of the distance measurements between antennas. Therefore, it is the aim of this invention, to define further means to enrich distance measurement methods (especially on the PC5 air interface for V2X use cases) to obtain reliable distances to a vehicle's outer boundaries and edges rather than distances to an antenna with uncertain mounting position.

The present invention provides a method of communicating vehicle positioning information, wherein signals are transmitted from at least one vehicle mounted antenna for indicating a position of the vehicle to another entity, the signals including information concerning at least one of an identity of the at least one antenna and information providing a displacement between the at least one antenna and a boundary of the vehicle.

In a first aspect of the invention each vehicle antenna may disseminate a signal that allows corrections to be performed (e.g., in lateral dimension and/or longitudinal dimension and/or altitudinal dimension) when distances between vehicles are being calculated for high accuracy vehicle positioning.

For this purpose, the signals may for instance comprise:
  explicit geometric (lateral and/or longitudinal and/or altitudinal) offset value(s) of the antenna positions relative to the vehicle's respective edge(s), or
  means to allow derivation of the relative position(s) of the respective antenna(s) towards the vehicle's outer boundaries, such as
    a unique antenna identifier (e.g., "unique" per vehicle); or
    a rough position of the antenna (e.g., whether it is a front antenna, an antenna mounted on the right/left side of the vehicle, or a rear antenna); or
    the type of vehicle (e.g., information about manufacturer, model, body design, model year, and so on); or
    a unique vehicle identifier (e.g., "unique" per region where the calculations are supposed to take place), or
    the number of active antennas on the vehicle for this particular measurement.

In a second aspect of the present invention geometric dimensions of the (relevant part(s) of the) vehicle are derived from the antenna signals (e.g., by means of data base interrogations), in case the geometric offset value(s) are not (or, cannot be) signaled explicitly.

A third aspect of the invention provides different encoding options for the information of the first aspect:
  methods are provided to impress the signals at the physical layer of the PC5 air interface, for instance by re-using or re-dedicating (a sub set of) the already existing DM-RS;

re-using or re-dedicating (a sub set of) the already existing SLSS; or introducing new physical signals (e.g., Distance Determination Reference Signals, DD-RS) in the respective resource grid.

in addition (or as an alternative to impressing information to physical signals), the information of the first aspect may be transmitted via physical sidelink channels PSxCH (e.g., on the PSSCH or the PSBCH), the information being obtained from higher layers in the protocol stack. This approach may be used when the amount of data to be conveyed is getting larger (example: "This car is equipped with four antennas in total, one located on each corner. Antenna-ID # xyz1 is assigned to the right front corner, Antenna-ID # xyz2 is assigned to the left front corner, and so on").

A fourth aspect of the invention provides for the activation and deactivation of the signals on a per need basis including signalling flows between two or more vehicles.

A fifth aspect of the invention is a dynamic change of the symbol rate and the occupation pattern for insertion of the signals in the time domain depending on the scenario (e.g., to have more symbols of the signals for fast moving vehicles and less for slow moving or parking vehicles) depending on the scenario (e.g., to handle driving with high speed on a freeway differently from shunting at low speed in a garage).

Depending on a type of vehicle, there may be static and dynamic antenna configurations. Activation and de-activation of these kinds of antenna signals for antennas that are not active/needed all the time is a sixth aspect of the present invention.

The invention enables high accuracy positioning for vehicles. Previously, only the distance between two (or more) antennas mounted on vehicles could be measured, which does not satisfy the requirements of SA1 of bringing the granularity down to the centimetre range for lateral and longitudinal vehicle positioning.

In detail, the present invention provides the following benefits:

knowledge of the antenna position in relation to the geometrical dimensions (i.e. outer boundaries) of the respective vehicle(s) is essential for the high accuracy positioning use case, as the vehicle dimensions, antenna mounting point(s) and number of antennas may vary between different vehicles (cf. first and second aspects).

The re-use of already specified physical signals is beneficial, as no additional effort is required to perform distance measurements. Also, wireless communication can take place simultaneously without any limitations (namely on those resource elements that are not assigned to physical signals). Using special physical signals will be beneficial, as the signal could be designed to deliver an even higher accuracy (cf. third aspect).

The activation and de-activation on demand is beneficial, as it saves resources when distance measurements are not required (cf. fourth aspect).

The dynamic change of the symbol rate (cf. fifth aspect) is beneficial, as it saves resources when a low number of symbols is sufficient, while it enables high accuracy distance measurement in difficult situations (e.g. fast moving vehicles, . . . ).

The dynamic antenna configuration (cf. sixth aspect) is beneficial, as it also saves resources when a low number of antennas is sufficient, while it enables high accuracy distance measurement in complex situations (e.g. high propagation loss, or changing outer boundaries).

Preferred embodiments of the invention will now be described, by way of example only, with reference to the accompanying drawings in which.

Figure 1:
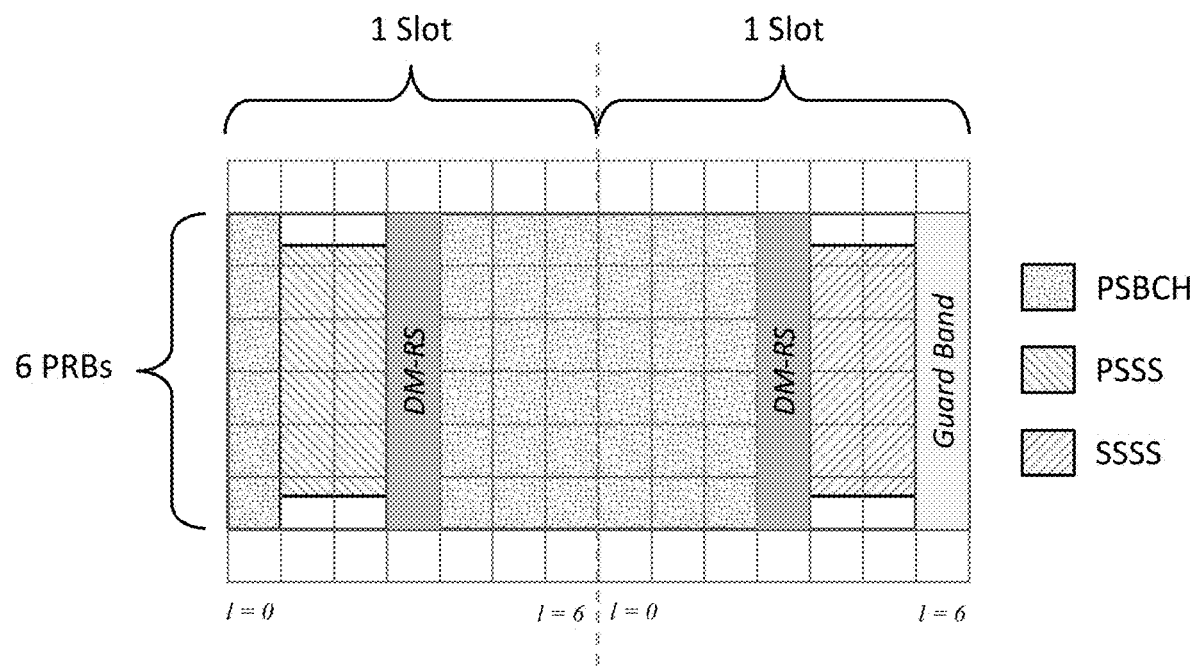
FIG. 1 shows a known sidelink resource grid for use on an LTE PC5 interface including primary and secondary sidelink synchronization signals and a physical sidelink broadcast channel.
Figure 2:
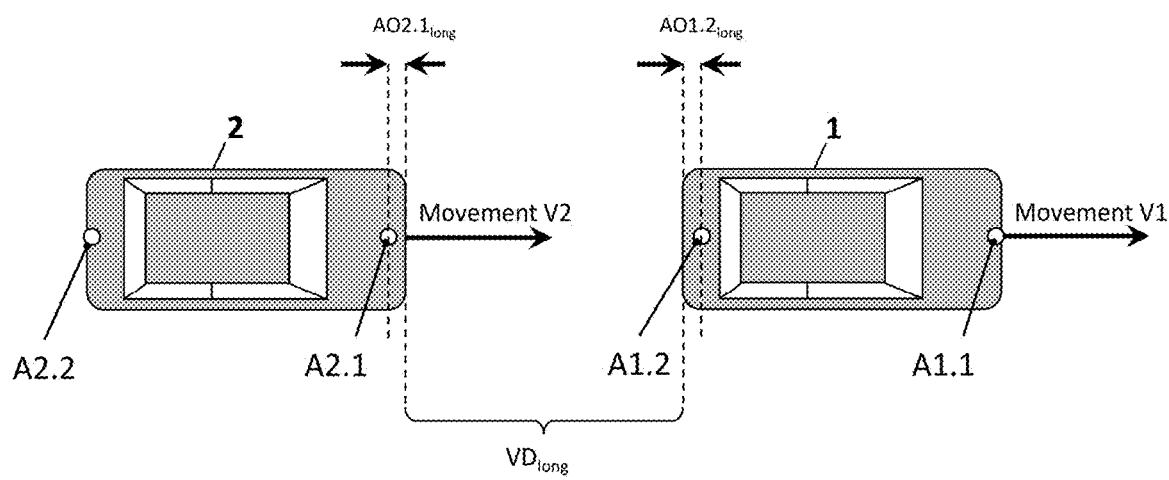
FIG. 2 illustrates a first vehicle positioning situation with two vehicles.

Referring to FIG. 2 there is shown a schematic relation between two vehicles 1 and 2 implementing the present invention. Each of the vehicles has two antennas, A1.1, A1.2, A2.1 and A2.2 with each antenna being positioned at a known position with respect to boundaries of the respective vehicles. As shown, antenna A1.2 is located at a distance $AO1.2_{long}$ from a rear boundary of vehicle 1 and antenna A2.1 is located a distance $AO2.1_{long}$ from a front boundary of vehicle 2 (the subscript "long" indicating that the distance is in a longitudinal direction).

In a first embodiment, antenna signals that allow corrections to be performed for high accuracy vehicle positioning are disseminated.

In this embodiment, each vehicle antenna disseminates distance determination reference signals (DD-RS) in a sidelink resource grid which is used on the LTE PC5 air interface. These DD-RSs may for instance comprise an antenna ID (that is ideally unique in the respective location), or it may comprise an antenna ID (that is unique per vehicle) plus a vehicle ID (that is ideally unique in the respective area). Here, vehicle 1 has coded the following exemplary antenna IDs on the DD-RS physical signals, which are transmitted on reserved resource elements for its respective antennas: The front antenna is A1.1 and rear antenna is A1.2. Likewise, vehicle 2 uses the following antenna identifiers represented by its DD-RS physical signals: the front antenna is A2.1 and the rear antenna is A2.2.

Furthermore, each vehicle is enabled to transmit over any of the available physical sidelink channels PSxCH, such as the PSBCH, an individual set of (primarily geometrical) ranging information. In one embodiment, such an individual set may be associated with a sidelink discovery message, or included in a SidelinkUEInformation RRC message. In another embodiment, this individual set may be part of (or associated with) a new type of message especially defined for ranging purposes.

In this embodiment, all antennas are mounted very close to the vehicles' outer boundaries and are centrally arranged on the engine hood or on the car's trunk (or, alternatively, at the front and rear bumpers). The height over street level can be omitted in this example for reasons of simplicity.

In the example, vehicle 1 transmits the following set of data:

Vehicle-ID: abcd1234

Type of Vehicle: Midsize car

Number of active antennas: 2

Antenna A1.1=front antenna, centrally located, 0 mm away from the car's front edge.

Antenna A1.2=rear antenna, centrally located, 40 mm away from the car's rear edge.

and vehicle 2 transmits the following set of data:

Vehicle-ID: dcba4321

Type of Vehicle: Full size car

Number of active antennas: 2

Antenna A2.1=front antenna, centrally located, 75 mm away from the car's front edge.

Antenna A2.2=rear antenna, centrally located, 60 mm away from the car's rear edge In one embodiment, some details of the sets defined above are not transmitted. Instead each vehicle's individually transmitted Vehicle-ID is used to derive the other pieces of information, for example those pertaining to the respective car's outer boundaries, from a data base or by means of an algorithm.

Each of the two involved vehicles can now perform a distance determination method according to the following principles.

Vehicle 1 is aware of the geometrical offset of its own antennas A1.1 and A1.2. For example, these geometrical data were stored in a vehicle internal storage. Vehicle 1 uses its own antenna A1.2 for rear measurements (i.e. in order to determine the distance to following vehicles). From the various DD-RSs transmitted by vehicle 2 as physical reference signals (one per antenna mounted at vehicle 2) and the set of ranging information received over one of the physical sidelink channels PSxCH, vehicle 1 knows which antenna reference signal to use (and which to neglect) for distance measurements plus the respective geometrical antenna offset, namely front antenna A2.1 with an offset of 75 mm. The distance measurement itself (i.e. obtaining the value "$D_{A1.2-A2.1}$") is done by well-known means and not part of this invention, e.g. by calculating the wave travelling time from the received DD-RS and multiplying it with the speed of light.

$$VD_{long} = D_{A1.2-A2.1} - AO2.1_{long} - AO1.2_{long}$$

$$VD_{long} = D_{A1.2-A2.1} - (75 \text{ mm} + 40 \text{ mm})$$

$$VD_{long} = D_{A1.2-A2.1} - 115 \text{ mm}$$

In order to determine the distance between the two vehicles, the geometrical details pertaining to other antennas (such as antenna A2.2) don't have to be taken into account, and the reference signals transmitted by those antennas (e.g. antenna A2.2) don't have to be analysed. The term $D_{A1.2-A2.1}$ is the measured distance between the antennas A1.2 and A2.1, while the subtrahend in the formula above represents a correction factor. The result "$VD_{long}$" is the distance between the front edge of vehicle 2 and the rear edge of vehicle 1.

In the exemplary syntax Ax.y chosen above, the letter "x" represents the vehicle and the letter "y" specifies the antenna associated with said vehicle. For the front antenna "y" is set to "1", for the rear antenna "y" is set to "2". Other syntactical structures and/or other values are of course also possible.

A vehicle may also use the various antenna identifiers received as physical reference signals from nearby other vehicles to retrieve the desired set(s) of ranging information from a data base, for instance if the transmission of the ranging information by the other vehicles on any of the physical sidelink channels PSxCH over the PC5 air interface was defective, or if there was no transmission at all. The antenna identifiers may be encoded in a form of a reference or link for example pointing to a file's storage location in a data repository. The reference or link may consist of or include a form of uniform resource locator (URL), or derivations thereof. The data base may be a logical entity that consists of several distributed physical memory entities and any set of ranging information may be stored there either in parts or in its entirety. The data base may reside in (at least one of) the vehicle(s) or in some third-party servers on the internet or in both; and the data base queries may take place for example at application layer, for instance over the PC5 air interface or over LTE Uu air interface or over both.

Figure 3:
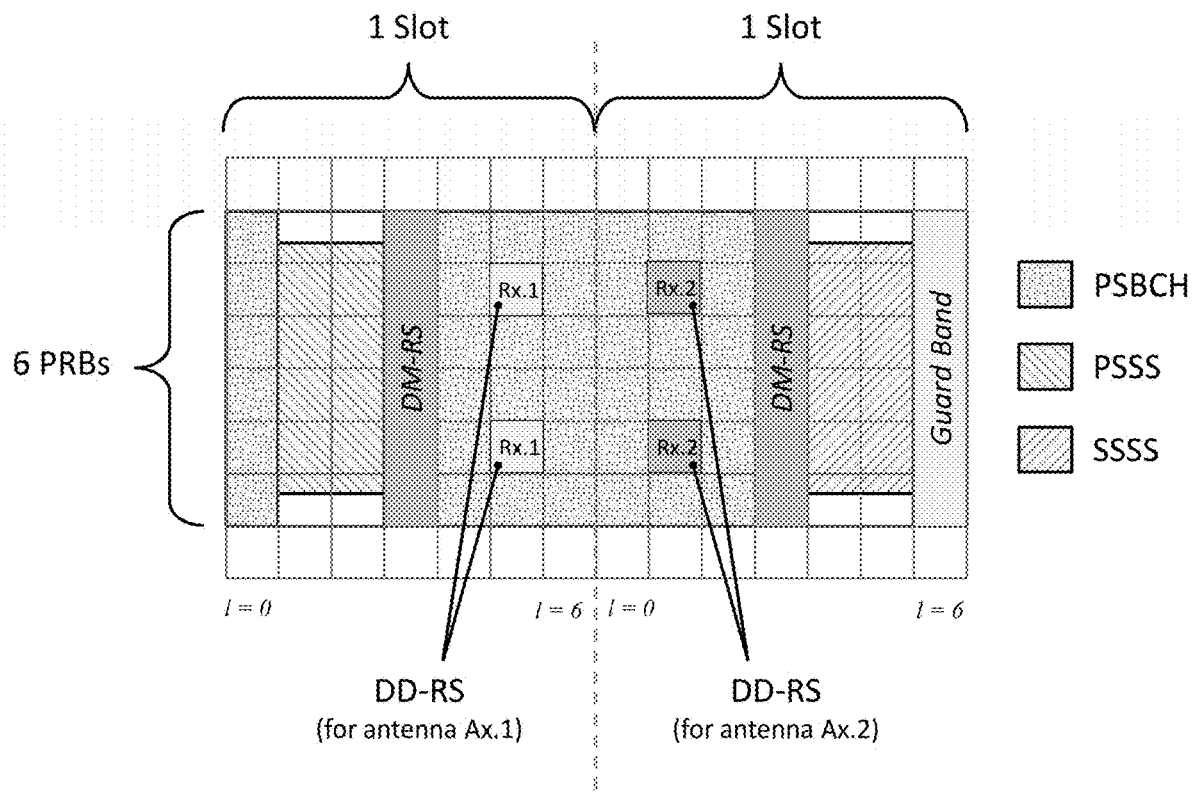
FIG. 3 shows a sidelink resource grid for a two-antenna vehicle.

FIG. 3 shows an example sidelink resource grid in which certain resource elements (here: two for each antenna) are reserved for the DD-RS physical signals that may be configured to carry antenna identifiers. The different DD-RS physical signals are distributed in the example sidelink resource grid with an offset in the time domain to one another, whereas different symbols from the same DD-RS physical signal are separated in frequency domain. A resource element Rx.1 that is used by a first antenna Ax.1 for dissemination of its unique DD-RS physical signal is not used by the second antenna Ax.2 (and vice versa). Thus, the receiving antenna is not required to estimate the quality of all spatially separated radio resources; instead the receiving side is only required to measure on resources that are assigned to the DD-RSs (and the related antenna(s)) that are of relevance, as indicated in the set of ranging information (depending on the use case).

In another example, some or all antennas are using the same time-frequency resources with different DD-RSs for each antenna. This is advantageous, as it saves resources.

In yet another example, all antennas use the same DD-RS, but different time-frequency resources. This is advantageous, as the receiver can be built more simply as only one correlator will be used to derive the distance to all antennas, instead of one correlator for each antenna. For this method to work properly, it must be clearly defined which antenna is using which of the time-frequency resources.

A set of (primarily geometrical) ranging information e.g., obtained from higher layers in the protocol stack may be transmitted via any of the physical sidelink channels PSxCH (e.g., on the PSSCH or the PSBCH).

A possible encoding option in ASN.1 notation for the set of ranging information is given below. In the present example with two antennas per vehicle, the variable "maxAntennas" takes on the value of "2", so that the portion labelled with "AntennaGeoDetails" appears twice, firstly for antenna Ax.1, e.g. the front antenna on vehicle and secondly for antenna Ax.2, e.g. the rear antenna on vehicle 'x'. The variable "Antenna-ID" is used to correlate the DD-RS transmitted via physical layer reference signals with the corresponding set(s) of ranging information transmitted via any of the physical sidelink channels PSxCH. The DD-RS is generated by using the Antenna-ID. Any sequences with good correlation properties can be used, for example Zadoff-Chu sequences as used in LTE for the random access preambles (cf. 3GPP TS 36.211 chapter 5.7.2.). In this case, an Antenna-ID is mapped to one root sequence number "u" and one value for the cyclic shift "N_CS". This mapping could either be done static, i.e. it specified in a standard and the mapping table is stored on the mobile devices, or the mapping table is signalled to the mobile devices, or the values for "u" and "N_CS" are signalled directly as part of the ranging information instead of transmitting Antenna-IDs.

```
-- ASN1START
RangingInformation ::= SEQUENCE {
    Vehicle-ID ::= OCTET STRING,
    VehicleType ::= ENUMERATED {bicyle, motorcycle, midsize-car, fullsize-car, bus, truck,
...},
    Link ::= OCTET STRING,
    NumberOfAntennas ::= ENUMERATED {1, 2, 4, 8},
    Platooning ::= SEQUENCE {
        MemberOfPlatoon ::= BOOLEAN,
        PositionInPlatoon ::= ENUMERATED {first, middle, last},
    }
    ShuntingSpace ::= SEQUENCE {
        ShuntingSpaceFront ::= ENUMERATED {cm10, cm20, cm30, cm40, cm50, ...},
        ShuntingSpaceLeft ::= ENUMERATED {cm10, cm20, cm30, cm40, cm50, ...},
        ShuntingSpaceRight ::= ENUMERATED {cm10, cm20, cm30, cm40, cm50, ...},
        ShuntingSpaceRear ::= ENUMERATED {cm10, cm20, cm30, cm40, cm50, ...},
    }
    LoadingZone ::= SEQUENCE {
        LoadingZoneFront ::= ENUMERATED {m0.5, m1, m1.5, m2, m2.5, m3, ...},
        LoadingZoneLeft ::= ENUMERATED {m0.5, m1, m1.5, m2, m2.5, m3, ...},
        LoadingZoneRight ::= ENUMERATED {m0.5, m1, m1.5, m2, m2.5, m3, ...},
        LoadingZoneRear ::= ENUMERATED {m0.5, m1, m1.5, m2, m2.5, m3, ...},
    }
    AntennaGeoDetailsList ::= SEQUENCE (SIZE (1..maxAntennas)) OF AntennaGeoDetails
}
AntennaGeoDetails SEQUENCE {
    Antenna-ID ::= OCTET STRING,
    AntennaType ::= ENUMERATED {Static, Dynamic},
    OperationMode ::= ENUMERATED {On, Off},
    Position ::= ENUMERATED {front, left, right, rear, mid, upper, lower, ...},
    DetailedPosition ::= ENUMERATED {front-left, front-centre, front-right, ..., rear-left
rear-centre, rear-right},
    FrontOffset ::= ENUMERATED {mm5, mm10, mm15, mm20, mm25, mm30, ...},
    LeftOffset ::= ENUMERATED {mm5, mm10, mm15, mm20, mm25, mm30, ... },
    RightOffset ::= ENUMERATED {mm5, mm10, mm15, mm20, mm25, mm30, ...},
    RearOffset ::= ENUMERATED {mm5, mm10, mm15, mm20, mm25, mm30, ...},
    Height ::= ENUMERATED {mm100, mm200, mm300, mm400, mm500, ...}
}
-- ASN1STOP
```

The ASN.1 structure above also allows for expressing additional space requirements a vehicle might have for shunting or loading/unloading of goods.

The information element "Link" may contain a reference (e.g., a model specific reference in form of a URL) for data base interrogations as described above. Consequently, some parts of the proposed structure above may alternatively be derived from said data base.

Each vehicle transmits an individual set of ranging information. In one embodiment, such an individual set may be associated with (or included in) a sidelink discovery message, or a SidelinkUEInformation RRC message. In another embodiment, this individual set may be part of (or associated with) a new type of message especially defined for ranging purposes.

The two information elements "AntennaType" and "OperationMode" are included in view of a use case described below, in which a vehicle's outer boundaries may change dynamically, for instance when a truck pulling a trailer is taking a turn).

Figure 4:
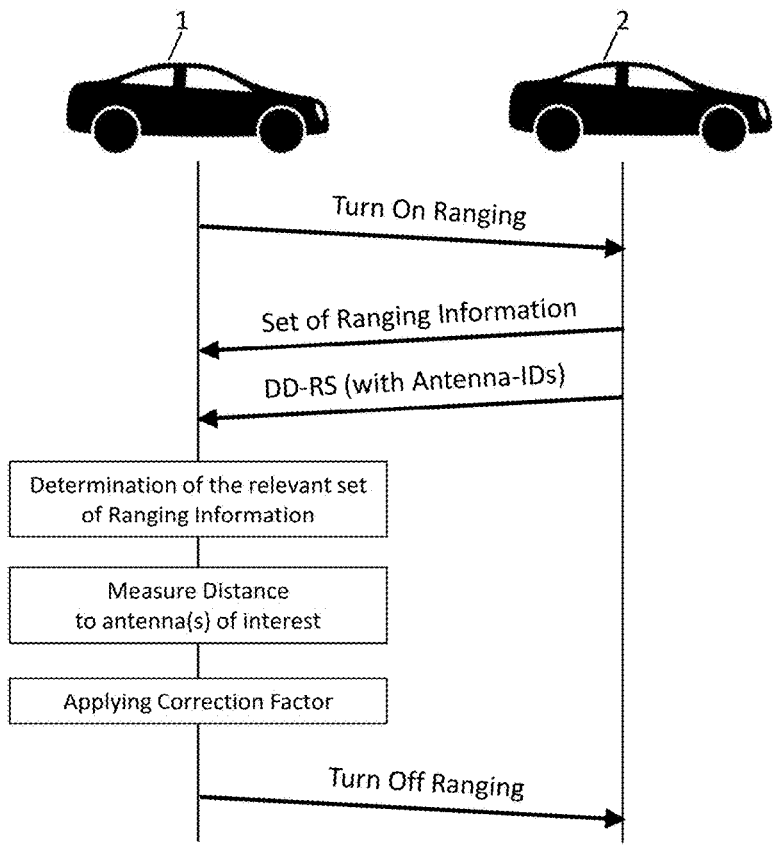
FIG. 4 is a message sequence chart for activating a deactivating vehicle positioning.

As indicated, a fourth aspect of the invention is the activation and deactivation of the signals on a per need basis. FIG. 4 shows an exemplary signalling flow between vehicles 1 and 2.

Vehicle 1 may request ("Turn On Ranging") the transmission of at least one of the two pieces of information from vehicle 2, namely the set of (primarily geometrical) ranging information and/or the antenna identifiers. The former may be received from higher layers of the protocol stack and transmitted over the PC5 air interface on any of the physical sidelink channels PSxCH (e.g., associated with or included in a sidelink discovery message or a SidelinkUEInformation RRC message, or it may be part of a new type of message especially defined for ranging purposes). The latter may be directly impressed into the physical layer as reference signals. The order of these two different types of information in FIG. 4 was chosen arbitrarily and may differ in real life deployments. Vehicle 1 may request the two pieces of information from vehicle 2 either once or repeatedly. Each pieces of information may therefore be transmitted only once or repeatedly. This is not shown in FIG. 4 for sake of simplicity.

The trigger message ("Turn On Ranging") sent by vehicle 1 can be transmitted in a form of a sidelink broadcast message over the PC5 interface to multiple vehicles. In another embodiment the trigger message sent by vehicle 1 is transmitted in form of a sidelink dedicated message over the PC5 interface to a single vehicle.

Based on the information received from vehicle 2, vehicle 1 is enabled to select the relevant antenna(s) $A2.y$ for ranging measurements and to apply a correction factor to arrive at the correct distance between the vehicles in question as described above.

The message sequence of FIG. 4 ends with a termination message ("Turn Off Ranging") that may be transmitted by vehicle 1 over the PC5 interface either in form of a sidelink broadcast message to multiple vehicles, or in form of a sidelink dedicated message to a single vehicle.

In yet another embodiment, the relative velocity between two vehicles is used to alter the symbol rate of the reference signals. The relative velocity could for example be derived in the following way. Vehicle 1 may inform (cf. "Velocity Indication #1" in FIG. 5) vehicle 2 about its velocity V1 (or about a desired periodicity for the transmission of the set of (primarily geometrical) ranging information and/or the DD-RS). Vehicle 2 may then calculate the relative velocity VR between the vehicles and use this value to control the DD-RS dissemination pattern on its own antennas A2.$y$. In the next step vehicle 2 may inform vehicle 1 about its own velocity V2 or about the relative velocity VR or both (cf. Velocity Indication #2 in FIG. 12). Vehicle 1 in turn may now itself calculate the relative velocity VR' (and verify the relative velocity VR received from vehicle 2) and use the result of these operations to control the DD-RS dissemination pattern on its own antennas A1.$y$. If needed, vehicle 1 may inform vehicle 2 about the verification results and possibly provide a modified relative velocity VR* to vehicle 2 (cf. Velocity Indication #3 in FIG. 5). This feedback may be used to fine tune the DD-RS dissemination pattern from vehicle 2. In another example, the relative velocity is derived from the Doppler frequency of the received sidelink signals. In yet another example, the relative velocity is calculated from the changes over time in the measured distance.

Figure 5:
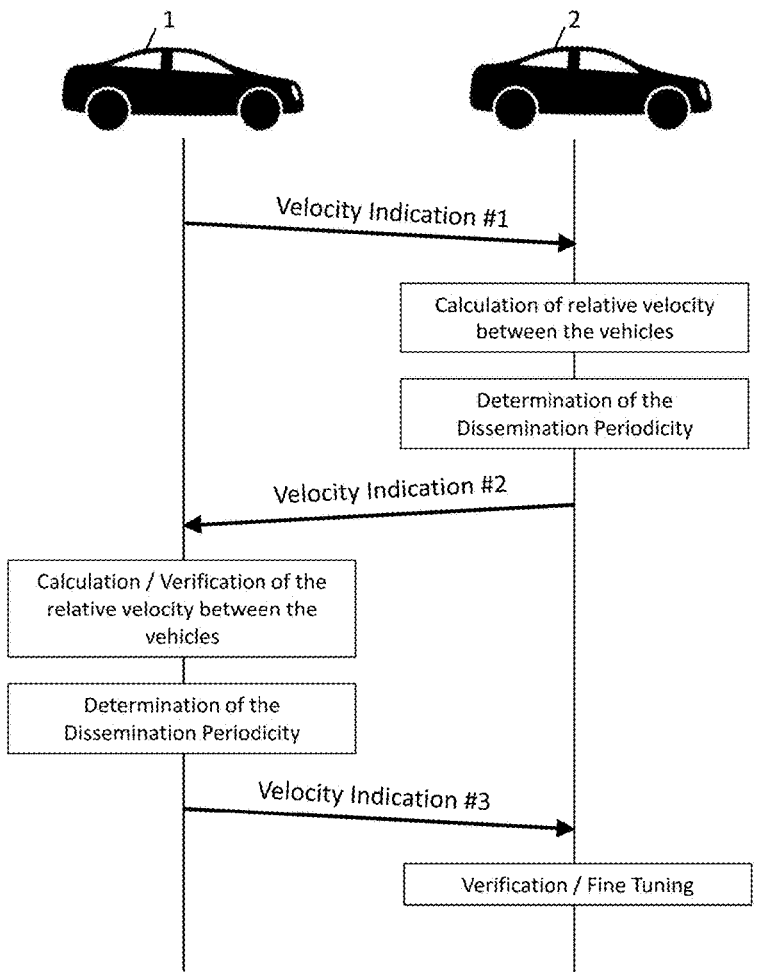
FIG. 5 is a second message sequence chart for velocity dependent vehicle positioning.

The message sequence of FIG. 5 may be repeated several times either partially or in its entirety. The vehicles may also negotiate a duration for the dissemination of a sequence of the DD-RS with a fixed periodicity. This is not shown in FIG. 5 for sake of simplicity.

In this approach, the relative velocities VR, VR' or VR* between the two vehicles may determine the dissemination periodicities of the antenna identifiers. That means, if vehicle 1 is running at low speed and vehicle 2 is running at high speed, then the dissemination periodicity of the various DD-RS on the various antennas may need to be increased. On the other hand, if vehicle 1 is running at a given speed and vehicle 2 is running at a similar speed, then the dissemination periodicity of the various DD-RS on the various antennas can be reduced. For this, thresholds pertaining to the relative velocity between the vehicles may be provisioned and used in the respective vehicles to control the DD-RS occupation patterns in the resource grid and with this also the symbol rate (i.e. the dissemination periodicity).

Alternatively or in addition to the relative velocity, the change of the symbol rate and/or the occupation pattern for insertion of the signals in the time domain can be controlled by the velocity over ground of the respective vehicle, e.g. in a way that more symbols of the DD-RS are sent for fast moving vehicles and less for slow moving or parking vehicles.

Depending on the type of vehicle, there may be static and dynamic antenna configurations for the method as will be explained below.

Figure 6:
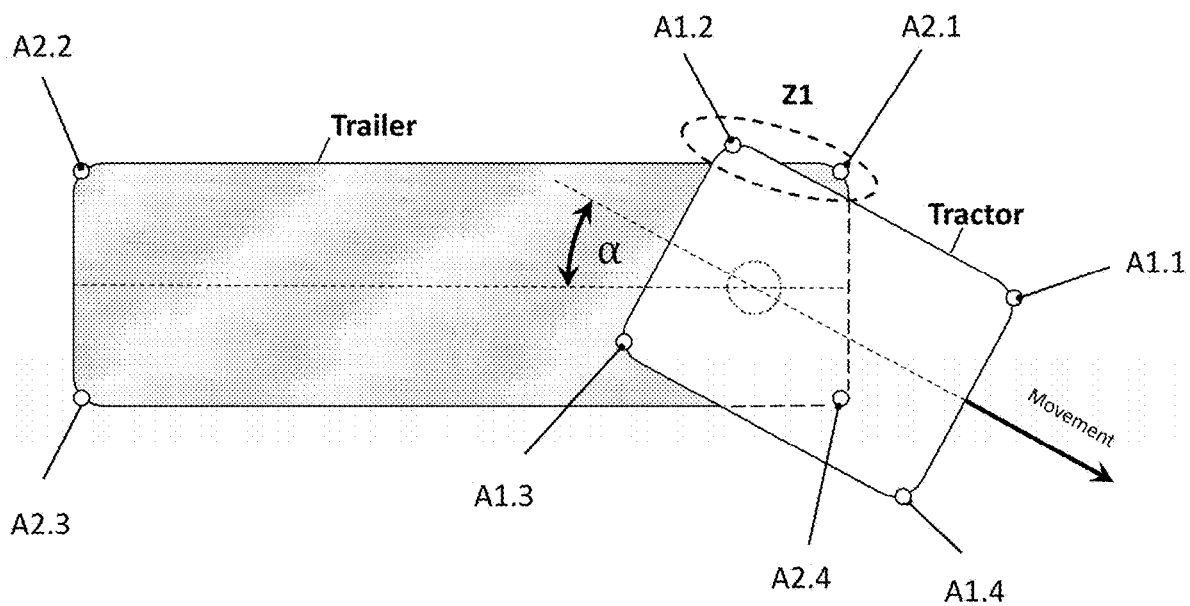
FIG. 6 shows an example of a dynamic antenna configuration.

FIG. 6 shows a tractor/trailer combination in a curve. As one can easily see from FIG. 6, the outer boundaries of this vehicle change dynamically as the vehicle moves. For example, new edges appear in zone Z1. It is therefore another aspect of the present invention to activate and deactivate antennas in a dynamic fashion to cover cases like the one shown in FIG. 6.

The change of the vehicle's outer boundaries can be detected by performing distance measurement between antennas associated with the same vehicle (here, the tractor/trailer combination of FIG. 6 is regarded as being one vehicle). In case of the example in FIG. 6, the antennas A2.1 and A1.2 will detect that they move closer to each other when the tractor/trailer combination turns right. Likewise, the antennas A2.4 and A1.3 can detect that they move further apart in the same situation.

An additional aspect of the present invention is therefore intra-vehicle distance measurements (i.e. configuring relevant antennas that are mounted at the same vehicle with reference signals so that they are able to determine the distance between each other antennas). Alternatively, the rotation angle $\alpha$ in the coupling could be used to detect a variation in a vehicle's outer boundaries.

In zone Z1 one can assume that the antennas A1.2 (left rear antenna of the tractor) and A2.1 (left front antenna of the trailer) are mounted on the edges so that they can be easily used for the method—they just have to be activated, if they haven't been used so far.

In respect of the above, the names and encoding variants of the information elements (IE) discussed in the present document shall be understood to merely serve as examples. There are many other options for the encoding of parameters and their values. This invention is by no means restricted to the encoding examples disclosed here.

Furthermore, the parameters may be sub-divided in one way or another, for example they may be collated in a new or already existing hierarchical structure, or grouped together with other information elements for instance in form of a list.

The invention claimed is:

1. A method of communicating vehicle positioning information, wherein signals are transmitted from at least one vehicle mounted antenna for indicating a position of the vehicle to another entity, the signals including information concerning at least one of information providing a displacement between the at least one antenna and a boundary of the vehicle, and an identity of the at least one antenna, the identity of the at least one antenna being such as to enable the another entity to determine the information providing the displacement between the at least one antenna and the boundary of the vehicle.

2. The method according to claim 1, wherein the signals include both the information concerning at least one of the identity of the at least one antenna and the information providing the displacement between the at least one antenna and the respective boundary of the vehicle.

3. The method according to claim 1, wherein the information concerning the identity of the at least one antenna comprises at least one of an antenna identifier, an indication of a position of the antenna with respect to the vehicle, a type of the vehicle, a vehicle identifier and a number of antennas on the vehicle.

4. The method according to claim 1, wherein the information providing the displacement between the at least one antenna and the boundary of the vehicle comprises information relating to an identity of the vehicle sufficient for the another entity to derive positioning information of the at least one antenna.

5. The method according to claim 1, wherein the signals are transmitted as sidelink signals over a PC5 air interface and wherein differing antennas of the vehicle are arranged to transmit in a manner such that a first antenna uses a first resource element and a second antenna uses a second resource element different from the first resource element.

6. The method according to claim 5, wherein the signals are transmitted as distance determination reference signals with signals from the first antenna being transmitted in a first time slot and signals from the second antenna being transmitted in a second time slot.

7. The method according to claim 1, wherein the signals are transmitted in response to the vehicle receiving a message from the another entity requesting the vehicle to transmit positioning information.

8. The method according to claim 7, wherein the signals are repeatedly transmitted until the vehicle receives a message from the another entity requesting the vehicle to cease transmission of the signals.

9. The method according to claim 1, wherein the signals are transmitted at a variable frequency, the variable frequency being dependent on a relative velocity between the vehicle and the another entity.

10. The method according to claim 1, wherein the information providing the displacement between the at least one antenna and the boundary of the vehicle is dependent on a current orientation of the vehicle with respect to the another entity.

11. The method according to claim 10, wherein additional antennas are activated if the vehicle changes its orientation with respect to the another entity.

12. The method according to claim 1, wherein the signals are sent by means of at least one of demodulation reference signals, sidelink synchronization signals and distance determination reference signals.

13. The method according to claim 1, wherein the another entity is a second vehicle.

\* \* \* \* \*